(12) United States Patent
Kominami et al.

(10) Patent No.: US 10,530,262 B2
(45) Date of Patent: Jan. 7, 2020

(54) RESONANCE-TYPE POWER CONVERSION DEVICE AND ABNORMALITY DETERMINING METHOD

(71) Applicant: Panasonic Intellectual Property Management Co., Ltd., Osaka (JP)

(72) Inventors: Satoshi Kominami, Kanagawa (JP); Nobuaki Satoh, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/085,074

(22) PCT Filed: Feb. 14, 2017

(86) PCT No.: PCT/JP2017/005211
§ 371 (c)(1),
(2) Date: Sep. 14, 2018

(87) PCT Pub. No.: WO2017/163666
PCT Pub. Date: Sep. 28, 2017

(65) Prior Publication Data
US 2019/0260298 A1    Aug. 22, 2019

(30) Foreign Application Priority Data

Mar. 25, 2016 (JP) ................................ 2016-062313
Feb. 8, 2017 (JP) ................................ 2017-021245

(51) Int. Cl.
*H02M 3/335* (2006.01)
*H02M 7/5387* (2007.01)
(Continued)

(52) U.S. Cl.
CPC ..... *H02M 3/33569* (2013.01); *H02M 7/5387* (2013.01); *G05F 1/567* (2013.01);
(Continued)

(58) Field of Classification Search
CPC .................... G05F 1/567; G05F 1/573; H02M 2007/4815; H02M 2001/327; H02M 7/4826
(Continued)

(56) References Cited

U.S. PATENT DOCUMENTS 6,587,051 B2 *   7/2003   Takehara ........... G08B 13/1409
                                                     307/117
7,733,616 B2 *   6/2010   Yamada ................ B60L 3/0023
                                                     318/432
(Continued)

FOREIGN PATENT DOCUMENTS

| JP | 2004-364493 | 12/2004 |
| JP | 2010-252443 | 11/2010 |
| JP | 2014-217199 | 11/2014 |

OTHER PUBLICATIONS

International Search Report of PCT application No. PCT/JP2017/005211 dated Apr. 4, 2017.

*Primary Examiner* — Gary A Nash
(74) *Attorney, Agent, or Firm* — Greenblum & Bernstein, P.L.C.

(57) ABSTRACT

A resonance power conversion device includes a bridge circuit, a transformer, a current detection circuit, and a control circuit. The bridge circuit includes a plurality of switching elements and receives a DC power. The transformer is connected to an output side of the bridge circuit. The current detection circuit detects a value of a current flowing through at least one of the plurality of switching elements. The control circuit determines whether or not an abnormality is occurring in the resonance power conversion device, based on the value detected by the current detection circuit at a predetermined time during a switching control.

12 Claims, 5 Drawing Sheets

(51) Int. Cl.
  *H02M 1/00* (2006.01)
  *G05F 1/573* (2006.01)
  *H02M 7/48* (2007.01)
  *G05F 1/567* (2006.01)
  *H02M 1/32* (2007.01)
(52) U.S. Cl.
  CPC ............ *G05F 1/573* (2013.01); *H02M 7/4826* (2013.01); *H02M 2001/0009* (2013.01); *H02M 2001/327* (2013.01); *H02M 2007/4815* (2013.01)
(58) Field of Classification Search
  USPC ..... 363/21.02, 21.03, 56.02–56.04, 56.1, 78, 363/98
  See application file for complete search history.

(56) References Cited

U.S. PATENT DOCUMENTS

| | | | |
|---|---|---|---|
| 2001/0004322 A1* | 6/2001 | Kurokami | H02M 7/53873 363/56.03 |
| 2008/0198638 A1* | 8/2008 | Reinberger | H02M 3/3376 363/74 |
| 2014/0092655 A1* | 4/2014 | Igarashi | B60L 3/003 363/56.03 |

* cited by examiner

RESONANCE-TYPE POWER CONVERSION DEVICE AND ABNORMALITY DETERMINING METHOD

This application is a U.S. national stage application of the PCT International Application No. PCT/JP2017/005211 filed on Feb. 14, 2017, which claims the benefit of foreign priority of Japanese patent application No. 2016-062313 and No. 2017-021245 filed on Mar. 25, 2016 and Feb. 8, 2017, respectively, the contents all of which are incorporated herein by reference.

TECHNICAL FIELD

The present disclosure relates to a resonance power conversion device which employs current resonance and an abnormality determining method.

BACKGROUND ART

Electric vehicles and hybrid vehicles which use electric power from storage batteries as power are in widespread use. In such electric vehicles and hybrid vehicles, a DC-DC converter is used that is a power conversion device which boosts or steps down a direct-current (DC) voltage for charging and voltage conversion of the batteries. In particular, due to the demand for high efficiency and low noise, a power conversion device which employs current resonance has been recently used in electric vehicles and hybrid vehicles.

A DC-DC converter which employs current resonance is capable of performing zero voltage (current) switching, which operates the switching element in a state where at least one of voltage and current is zero, thereby reducing the power loss during the operation.

However, in the DC-DC converter which employs current resonance, the resonant frequency of at least one of a transformer and a resonant capacitor which are the components for resonance may vary due to aging degradation or a change in characteristics caused by temperature change in the transformer and/or the resonant capacitor. In such a case, zero voltage (current) switching cannot be accurately performed, which results in, for example, a decrease in power conversion efficiency due to an increase in switching loss, generation of switching noise, or circuit failure.

For example, Patent Literature (PTL) 1 discloses a technique for coping with variations in resonant frequency caused by the change in characteristics of the transformer and/or the resonant capacitor. PTL 1 discloses a power conversion device which resets the switching frequency only when a state, in which the input and output power are limited by an input and output power limiting means which limits the input and output power, continues for a predetermined time period.

CITATION LIST

Patent Literature

PTL 1: Japanese Unexamined Patent Publication No. 2014-217199

SUMMARY OF THE INVENTION

The present disclosure provides a resonance power conversion device and an abnormality determining method which are capable of accurately detecting variations in resonant frequency within a short time period.

The resonance power conversion device according to the present disclosure includes a bridge circuit, a transformer, a current detection circuit, and a control circuit. The bridge circuit includes a plurality of switching elements and receives a DC power. The transformer is connected to an output side of the bridge circuit. The current detection circuit detects the value of a current flowing through at least one of the plurality of switching elements. The control circuit determines whether or not an abnormality is occurring in the resonance power conversion device, based on the value detected by the current detection circuit at a predetermined time during the switching control.

An abnormality determining method performed by the resonance power conversion device according to the present disclosure determines an abnormality in the resonance power conversion device which includes: a bridge circuit including a plurality of switching elements and receiving a DC current; a transformer; a current detection circuit which detects the value of a current flowing through at least one of the plurality of switching elements; and a control circuit. In this method, the value of a current flowing through the at least one of the plurality of switching elements is detected by the current detection circuit at a predetermined time during the switching control. Then, whether or not an abnormality is occurring in the resonance power conversion device is determined by the control circuit, based on the detected current value.

According to the present disclosure, it is possible to accurately detect variations in resonant frequency within a short time period.

DESCRIPTION OF EMBODIMENT

Prior to the description of an embodiment of the present disclosure, problems in the conventional technique will be briefly described. In the technique disclosed in PTL 1 described above, variations in resonant frequency can be detected only after a predetermined time period elapses, which makes it difficult to detect variations in resonant frequency within a short time period.

Figure 1:
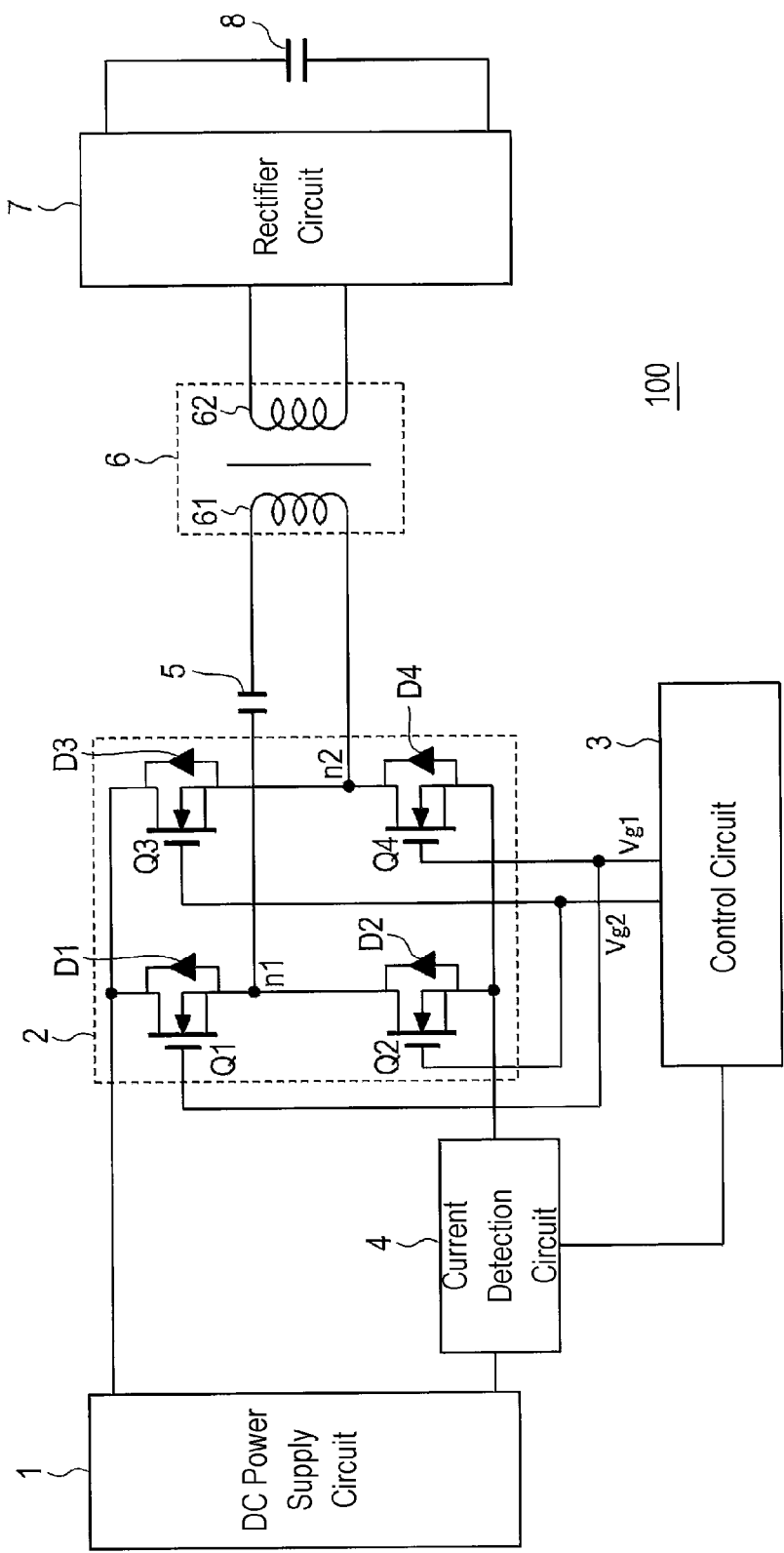
FIG. 1 is a circuit diagram illustrating an example of a configuration of a power conversion device according to an embodiment of the present disclosure.

Hereinafter, an embodiment of the present disclosure will be described with reference to the drawings. FIG. 1 is a circuit diagram illustrating an example of a configuration of power conversion device 100 according to the present embodiment.

<Configuration Example of Power Conversion Device 100>

Power conversion device 100 includes DC power supply circuit 1, bridge circuit 2, control circuit 3, current detection circuit 4, resonant capacitor 5, transformer 6, rectifier circuit 7, and smoothing capacitor 8.

DC power supply circuit 1 supplies a DC power of, for example, a fuel cell, a battery, or an AC/DC converter. Bridge circuit 2 is connected between the both terminals of DC power supply circuit 1. As illustrated in FIG. 1, bridge circuit 2 includes switching elements Q1 to Q4 which are connected in a full-bridge manner.

In bridge circuit 2, switching elements Q1 and Q2 are connected in series, and switching elements Q3 and Q4 are connected in series. Switching elements Q1 and Q2 are connected to switching elements Q3 and Q4 in parallel so that bridge circuit 2 is formed in a full-bridge manner. Each of switching elements Q1 to Q4 is formed by, for example, a field-effect transistor (FET), in particular, by a metal-oxide-semiconductor FET (MOSFET).

Switching elements Q1 to Q4 respectively include parasitic diodes D1 to D4. Rather than including parasitic diodes D1 to D4 in switching elements Q1 to Q4, it may be that diodes independent from switching elements Q1 to Q4 are connected in parallel, respectively.

In bridge circuit 2, drain terminals of switching elements Q1 and Q3 are connected to DC power supply circuit 1. A source terminal of switching element Q1 is connected to a drain terminal of switching element Q2, and a source terminal of switching element Q3 is connected to a drain terminal of switching element Q4. Source terminals of switching elements Q2 and Q4 are connected to DC power supply circuit 1 via current detection circuit 4. Moreover, resonant capacitor 5 and primary winding 61 of transformer 6 are connected in series between node n1 and node n2. Node n1 is disposed between the source terminal of switching element Q1 and the drain terminal of switching element Q2. Node n2 is disposed between the source terminal of switching element Q3 and the drain terminal of switching element Q4.

Moreover, gate terminals of switching elements Q1 to Q4 are connected to control circuit 3. Control circuit 3 turns on and off (performs switching control on) switching elements Q1 to Q4 at a drive frequency predetermined based on the resonant frequency of power conversion device 100. Accordingly, bridge circuit 2 converts the DC power of DC power supply circuit 1 to a high-frequency alternating-current (AC) power. The drive frequency may be set to, for example, a value greater by a predetermined (minute) amount than the resonant frequency set at the time of circuit design. Moreover, current detection circuit 4 detects the value of a current passing through bridge circuit 2. In the present embodiment, current detection circuit 4 detects the current flowing through bridge circuit 2 in the direction from the side where DC power supply circuit 1 is connected to switching elements Q1 and Q3 to the side where DC power supply circuit 1 is connected to switching elements Q2 and Q4, as a positive direction.

Transformer 6 includes primary winding 61 and secondary winding 62 which are magnetically coupled with each other. Primary winding 61 of transformer 6 is connected to resonant capacitor 5, and to a connection line between the source terminal of switching element Q3 and the drain terminal of switching element Q4. In other words, transformer 6 is connected to the output side of bridge circuit 2. Secondary winding 62 of transformer 6 is connected to rectifier circuit 7. Transformer 6 transforms the voltage of the AC power supplied to primary winding 61 and transmits the transformed voltage to secondary winding 62. The AC power generated in secondary winding 62 of transformer 6 is converted into a DC power by rectifier circuit 7 and smoothing capacitor 8, and is supplied to a DC load which is not illustrated.

Figure 2:
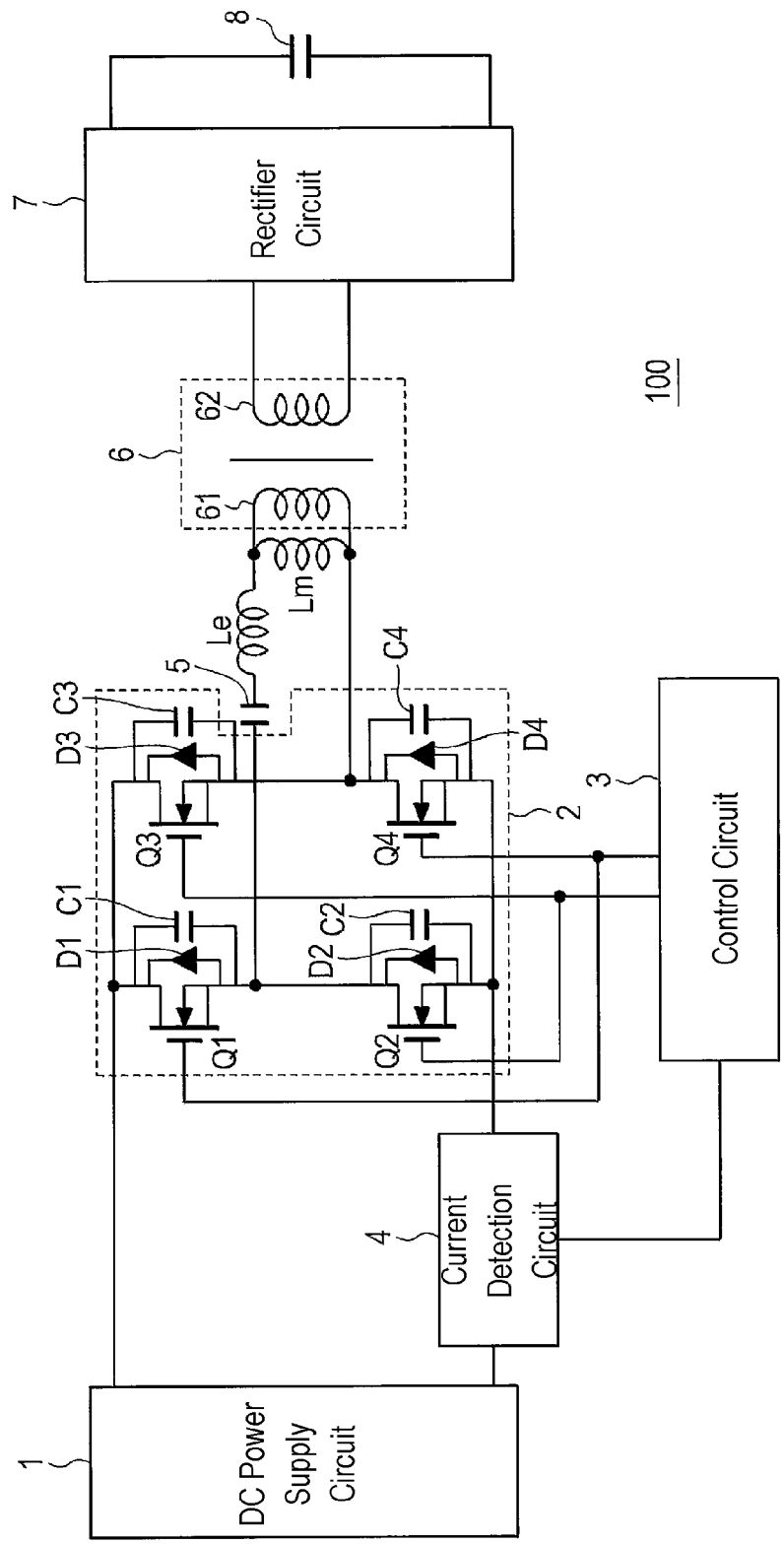
FIG. 2 is an equivalent circuit diagram in which parasitic elements are added to the power conversion device illustrated in FIG. 1.

FIG. 2 is an equivalent circuit diagram in which parasitic elements are added to power conversion device 100 illustrated in FIG. 1. C1 to C4 are the output capacitances of switching elements Q1 to Q4. Le is a leakage inductance of transformer 6. Lm is a magnetizing inductance of transformer 6. Resonant capacitor 5, leakage inductance Le, and magnetizing inductance Lm form a series LLC circuit. The following description is given with reference to the equivalent circuit. Note that one inductor may be formed by commonly using magnetizing inductance Lm and primary winding 61.

In the following description, a circuit including bridge circuit 2, resonant capacitor 5, leakage inductance Le, and magnetizing inductance Lm may be referred to as a primary side, and a circuit including rectifier circuit 7, smoothing capacitor 8, and the DC load which is not illustrated may be referred to as a secondary side.

<Operating Principle of Power Conversion Device 100>

Figure 3:
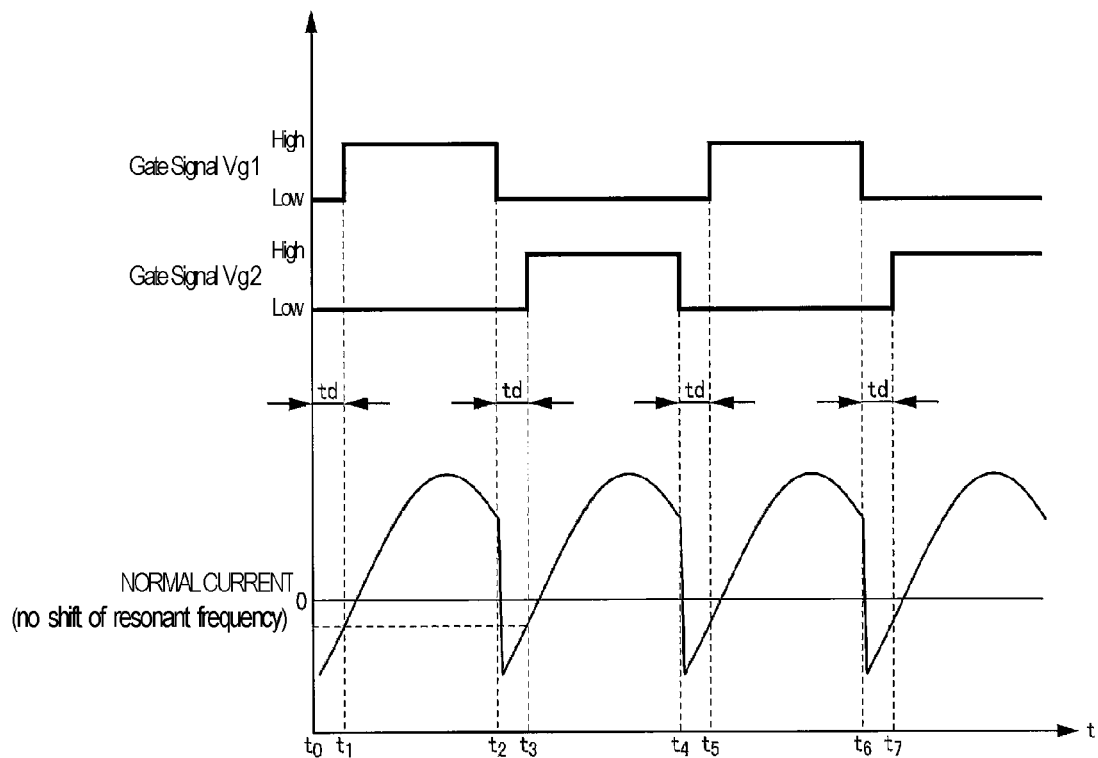
FIG. 3 illustrates waveforms of gate signals Vg1 and Vg2 output from a control circuit to control a bridge circuit, and a waveform of a current flowing through the bridge circuit.

Hereinafter, an operation and operating principle of power conversion device 100 operating normally will be described. FIG. 3 is a diagram illustrating the waveforms of gate signals Vg1 and Vg2 output from control circuit 3 to control bridge circuit 2, and the waveform of the current flowing through bridge circuit 2. Note that the value of the current flowing through bridge circuit 2 is obtained by adding the current flowing through switching elements Q1 and Q4 and the current flowing through switching elements Q2 and Q3, and is detected by current detection circuit 4 as described above.

Gate signal Vg1 is a signal for turning on or off switching elements Q1 and Q4 of bridge circuit 2, and gate signal Vg2 is a signal for turning on or off switching elements Q2 and Q3. In the following description, the case will be described where gate signal Vg1 is used for simultaneously turning on or off switching elements Q1 and Q4. However, for example, switching element Q4 may be turned on or off in a slightly delayed fashion compared to switching element Q1. In a similar manner, in the following description, the case will be described where gate signal Vg2 is used for simultaneously turning on or off switching elements Q2 and Q3. However, for example, switching element Q3 may be turned on or off in a slightly delayed fashion compared to switching element Q2.

As illustrated in FIG. 3, time $t_1$ and time $t_5$ indicate the times at which switching elements Q1 and Q4 are turned on, and time $t_2$ and time $t_6$ indicate the times at which switching elements Q1 and Q4 are turned off. Moreover, time $t_3$ and time $t_7$ indicate the times at which switching elements Q2 and Q3 are turned on, and time $t_0$ and time $t_4$ indicate the times at which switching elements Q2 and Q3 are turned off. Note that dead times (td) are provided during the period from when switching elements Q1 and Q4 are turned off to when switching elements Q2 and Q3 are turned on, and during the period from when switching elements Q2 and Q3 are turned off to when switching elements Q1 and Q4 are turned on.

As described above, the current value detected by current detection circuit 4 is a measured value of the current passing through bridge circuit 2. As described above, the signal detected by current detection circuit 4 regards the direction from the side where DC power supply circuit 1 is connected to switching elements Q1 and Q3 to the side where DC power supply circuit 1 is connected to switching elements Q2 and Q4 as a positive direction.

At time $t_1$ indicated in FIG. 3, control circuit 3 increases the level of gate signal Vg1 from Low (low-level) to High (high-level), thus, switching elements Q1 and Q4 are turned on. In the state where switching elements Q1 and Q4 are on from time $t_1$ to time $t_2$, a load current flows from DC power supply circuit 1 to switching element Q1, resonant capacitor 5, primary winding 61 of transformer 6, and switching element Q4 in this order. In other words, as illustrated in FIG. 3, the value of the current flowing through bridge circuit 2 increases in a positive direction.

When an input voltage is applied to the LLC circuit including resonant capacitor 5, leakage inductance Le and magnetizing inductance Lm, electric charges are stored in resonant capacitor 5 by a resonant operation. Moreover, the resonant current generated by resonant capacitor 5 and leakage inductance Le is provided, via secondary winding 62, to the DC load which is not illustrated.

As the voltage of resonant capacitor 5 increases, the voltage applied to primary winding 61 decreases. Therefore, the current provided to the secondary side also decreases. When the resonance ends, and the secondary-side current becomes zero, a magnetizing current flows only through the primary side, and the charging of resonant capacitor 5 is maintained.

At time $t_2$, control circuit 3 decreases the level of gate signal Vg1 from High to Low, thus, switching elements Q1 and Q4 are turned off. Immediately after switching elements Q1 and Q4 are turned off, output capacitance C1 and output capacitance C4 are charged by the magnetizing current flowing through the primary side, and output capacitance C2 and output capacitance C3 are discharged. Accordingly, the drain-source voltages of switching elements Q1 and Q4 increase, and the drain-source voltages of switching elements Q2 and Q3 decrease. When the drain-source voltages of switching elements Q2 and Q3 decrease to zero, a magnetizing current flows through parasitic diodes D2 and D3 of switching elements Q2 and Q3 in the direction in which the excitation energy stored in leakage inductance Le and magnetizing inductance Lm are reset.

Note that the period from time $t_2$ to time $t_3$ is a period of dead time, and all of switching elements Q1 to Q4 are off during this period.

When control circuit 3 increases the level of gate signal Vg2 from Low to High at time $t_3$, switching elements Q2 and Q3 are turned on. At this time, since a magnetizing current is flowing through switching elements Q2 and Q3 from the each source to the each drain, that is, in the negative direction, switching is performed when the drain-source voltages of switching elements Q2 and Q3 are zero. Therefore, zero-voltage switching (ZVS) is performed so that the switching loss at the time of turn-on can be avoided.

In a state where switching elements Q2 and Q3 are on from time $t_3$ to time $t_1$, the voltage charged in resonant capacitor 5 causes a magnetizing current to flow through the series LLC circuit, and the charges stored in resonant capacitor 5 are discharged. At the same time, the resonance current generated by resonant capacitor 5 and leakage inductance Le is provided, via secondary winding 62, to the DC load which is not illustrated.

As the voltage of resonant capacitor 5 decreases, the voltage applied to primary winding 61 decreases. Therefore, the current provided to the secondary side also decreases. When the secondary-side current becomes zero, a magnetizing current flows only through the primary side, and the charging of resonant capacitor 5 is maintained.

When control circuit 3 decreases the level of gate signal Vg2 from High to Low at time $t_4$, switching elements Q2 and Q3 are turned off. Immediately after switching elements Q2 and Q3 are turned off, output capacitance C1 and capacitance C4 are discharged by the magnetizing current flowing through the primary side, and output capacitance C2 and output capacitance C3 are charged. Accordingly, the drain-source voltages of switching elements Q1 and Q4 decrease, and the drain-source voltages of switching elements Q2 and Q3 gradually increase.

When the drain-source voltages of switching elements Q2 and Q3 increase to the input voltage, a resonant current keeps flowing in the direction in which the excitation energy stored in leakage inductance Le and magnetizing inductance Lm is reset. The excitation energy is regenerated in DC power supply circuit 1 via parasitic diodes D1 and D4 of switching elements Q1 and Q4. Subsequently, switching elements Q1 and Q4 are turned on again at time $t_5$. The operation at time $t_5$ is the same as the operation at time $t_1$, and the same operations as above are subsequently repeated.

Note that the turn-on operation of switching elements Q1 and Q4 at time $t_5$ ($t_1$) is the switching performed when the drain-source voltages of switching elements Q1 and Q4 are zero. Therefore, zero-voltage switching is performed so that the switching loss at the time of turn-on can be avoided.

<Operation Example of Power Conversion Device 100 in Abnormal Condition>

Next, an operation example of power conversion device 100 when an abnormality has occurred in power conversion device 100 will be described. In the embodiment according to the present disclosure, it is assumed that the abnormality is a failure in resonant capacitor 5. Specifically, the abnormality refers to a state where, for example, resonant capacitor 5 includes a plurality of capacitors connected in parallel and one of the capacitors has a failure, causing the capacitance of resonant capacitor 5 to decrease.

In general, resonant frequency fr of the series LLC circuit is calculated by following equation (1).

[Equation 1]

$$fr = \frac{1}{2\pi\sqrt{LC}} \quad (1)$$

Accordingly, when an abnormality, in which capacitance C of resonant capacitor 5 decreases, occurs in power conversion device 100, the resonant frequency of the series LLC circuit increases.

As described above, the drive frequency of bridge circuit 2 is designed to be a value greater than the resonant frequency set at the time of circuit design by a predetermined minute amount. Therefore, if the resonant frequency of the series LLC circuit increases due to an abnormality in power conversion device 100, the increased resonant frequency exceeds the drive frequency of bridge circuit 2.

Figure 4:
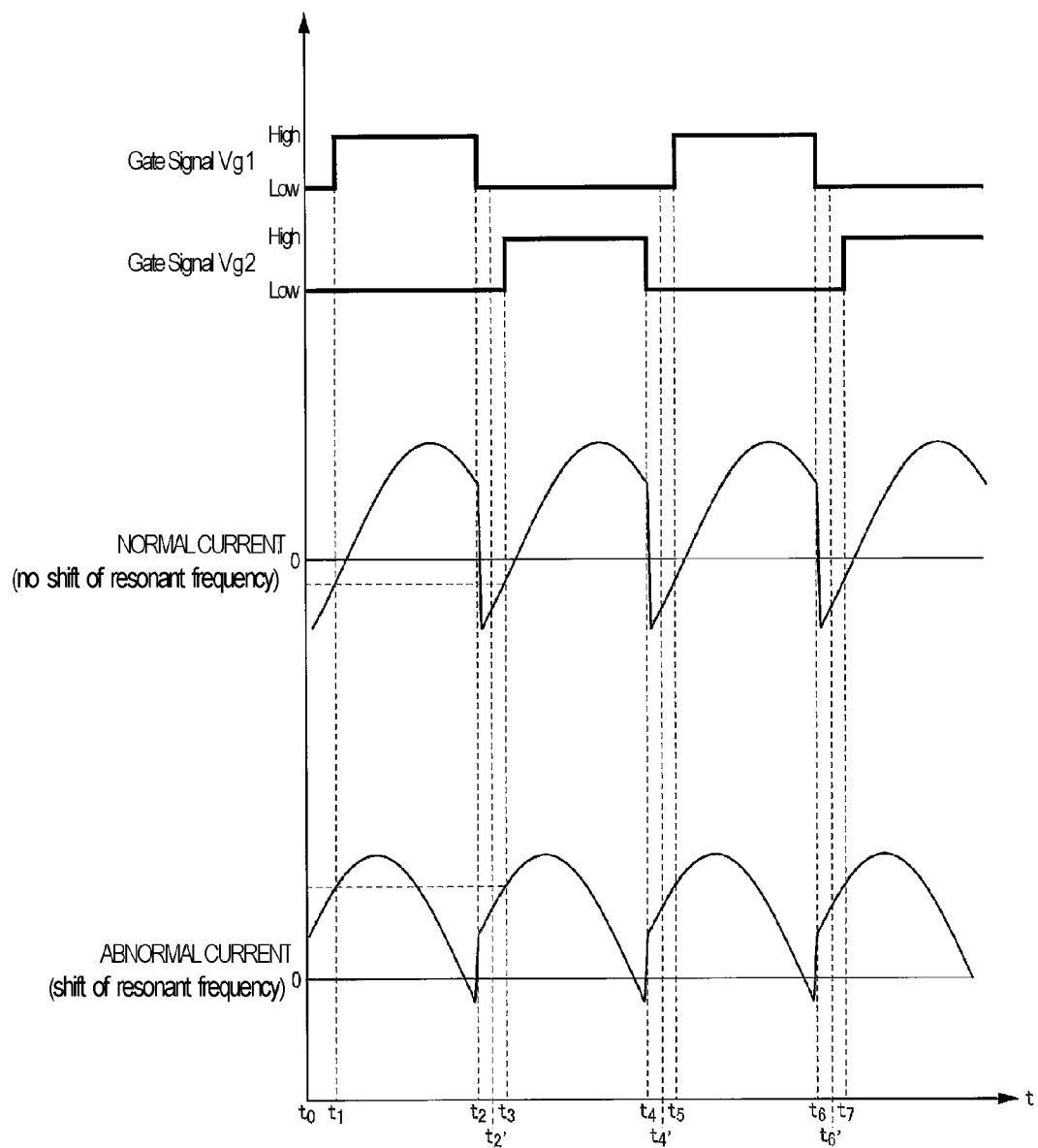
FIG. 4 illustrates comparison between a current flowing through the bridge circuit during a normal operation and a current flowing through the bridge circuit during an abnormal operation.

Thus, the resonant operation of the series LLC circuit shifts to the leading phase side, causing the resonant current flowing through the series LLC circuit to lead in phase. FIG. 4 illustrates comparison between the current flowing through bridge circuit 2 during a normal operation and the current flowing through bridge circuit 2 during an abnormal operation.

As illustrated in FIG. 4, since the current leads in phase during the abnormal operation, assuming that the period from when switching elements Q1 and Q4 of bridge circuit 2 are turned off to when switching elements Q2 and Q3 of bridge circuit 2 are turned off is one cycle, the current waveform during the abnormal operation has a shape in which the current waveform during the normal operation is horizontally reversed every cycle.

<Detection Process of Abnormal Operation>

Based on the above, a detection process of an abnormal operation in power conversion device 100 according to the embodiment in the present disclosure will be described.

As illustrated in FIG. 4, there are clear differences in value of the current flowing through bridge circuit 2 and detected by current detection circuit 4 between the normal operation and the abnormal operation. Accordingly, determining in advance the possible range of the current value at a predetermined time during the normal operation allows control circuit 3 to determine whether or not power conversion device 100 is operating abnormally by referring to the value detected by current detection circuit 4 at the predetermined time and determining whether or not the detected value is within the range determined in advance.

The possible range of the current value at a predetermined time during the normal operation may be determined by experimentally obtaining in advance the value of the current (normal current) flowing through bridge circuit 2 during the normal operation and the value of current (abnormal current) flowing through bridge circuit 2 during the abnormal operation as illustrated in FIG. 4, and comparing these values.

Hereinafter, specific examples will be described. As a first example, control circuit 3 determines whether or not an abnormality is occurring, based on the current value when gate signal Vg1 or Vg2 rises such as times $t_1$, $t_3$, and $t_5$. When gate signal Vg1 or Vg2 rises, that is, when switching elements Q1 and Q4 or switching elements Q2 and Q3 are turned on, a normal current flows in reverse through bridge circuit 2 via parasitic diodes D3 and D2 of switching elements Q3 and Q2. Therefore, as the normal current in FIG. 4 indicates, the current value when gate signal Vg1 or Vg2 rises is always a value less than zero.

In contrast, during the abnormal operation, the phase of the current shifts to a leading phase. Hence, the current value when gate signal Vg1 or Vg2 rises may be a value greater than or equal to zero as indicated by the abnormal current in FIG. 4. Accordingly, when control circuit 3 increases the level of gate signal Vg1 or Vg2 from Low to High, control circuit 3 refers to the value of the current flowing through bridge circuit 2 obtained by current detection circuit 4. When the value is greater than or equal to zero, control circuit 3 can determine that an abnormal operation is occurring in power conversion device 100. Note that when control circuit 3 determines that an abnormal operation is occurring in power conversion device 100, control circuit 3 outputs, to the outside (for example, an upper control circuit), a signal indicating that an abnormal operation is occurring.

Note that the abnormal current illustrated in FIG. 4 is an example. The current detected by current detection circuit 4 at the time of abnormal operation of power conversion device 100 does not necessarily have such a waveform. Therefore, even when the current value when gate signal Vg1 or Vg2 rises is a value less than zero, there may be a case where an abnormality is occurring in power conversion device 100. However, when the resonant frequency is significantly greater than the resonant frequency set at the time of circuit design, the phase of the current shifts to the leading phase. Hence, the current value when gate signal Vg1 or Vg2 rises is a value greater than zero. When the resonant frequency is significantly greater than the resonant frequency set at the time of circuit design, not only zero-voltage switching cannot be performed in bridge circuit 2, but also other incidents may occur. Examples of such incidents include an incident that a through-current flows from switching element Q1 to switching element Q2, and an incident that bridge circuit 2 generates heat which causes a failure in power conversion device 100. The above described abnormality detection method performed by control circuit 3 may fail detection of slight variations in resonant current from the resonant current set at the time of circuit design. However, the method can accurately detect significant variations which cause a failure in power conversion device 100.

As a second example, control circuit 3 determines whether or not an abnormality is occurring, based on, for example, the current value obtained after a short time period elapses from when gate signal Vg1 or Vg2 falls. FIG. 4 illustrates the times at which a short time period elapses after the fall of gate signal Vg1 or Vg2 as $t_2'$, $t_4'$, and $t_6'$. As illustrated in FIG. 4, when gate signal Vg1 or Vg2 falls, that is, immediately after switching elements Q1 and Q4 or Q2 and Q3 are turned off, a normal current flows in reverse through bridge circuit 2 in response to the turn-off, and subsequently increases in the positive direction. In contrast, as illustrated in FIG. 4, an abnormal current does not flow in reverse through bridge circuit 2, and subsequently increases in the positive direction.

Therefore, when control circuit 3 decreases the level of gate voltage Vg1 or Vg2, control circuit 3 refers to the value of the current flowing through bridge circuit 2 obtained by current detection circuit 4, and determines that an abnormal operation is occurring in power conversion device 100 when the value is greater than zero. Note that, in a similar manner to the first example, when control circuit 3 determines that an abnormal operation is occurring in power conversion device 100, control circuit 3 outputs, to the outside (for example, an upper control circuit), a signal indicating that an abnormal operation is occurring.

The predetermined time at which the range of the current value during the normal operation is determined in advance has been described using two specific examples. However, the present disclosure is not limited to these two examples. The predetermined time may be any time as long as the normal current can be clearly distinguished from the abnormal current which flows when the resonant frequency significantly varies from the resonant frequency set at the time of circuit design.

As described above, power conversion device 100 according to the embodiment in the present disclosure includes bridge circuit 2, transformer 6, current detection circuit 4, and control circuit 3. Bridge circuit 2 includes a plurality of switching elements and receives a DC power. Transformer 6 is connected to the output side of bridge circuit 2. Current detection circuit 4 detects the value of a current flowing through at least one of the plurality of switching elements. Control circuit 3 determines whether or not an abnormality is occurring in power conversion device 100, based on the value detected by current detection circuit 4 at a predetermined time during a switching control.

With such a configuration, it is possible to accurately detect an abnormality in power conversion device 100, such as a significant increase in resonant frequency, without requiring much time for detection.

Although various embodiments have been described above with reference to the drawings, the present disclosure is not limited to the examples. It would be obvious that an ordinary skilled person conceives modifications and corrections of each embodiment within the scope defined in the claims, and it should be understood that those modifications and corrections fall within the technical scope of the present disclosure.

In the above embodiment, current detection circuit 4 is connected to the downstream of bridge circuit 2 to detect the value of the current flowing through bridge circuit 2. However, the present disclosure is not limited to the example. For example, current detection circuit 4 may be disposed at the upstream of bridge circuit 2 or inside bridge circuit 2. Moreover, current detection circuit 4 may detect only the value of the current flowing through any one of the switching elements instead of detecting the value of the current flowing through entire bridge circuit 2. In this case, it is enough that the respective ranges of the value of the current flowing through the switching element during a normal operation and an abnormal operation are obtained in advance and that control circuit 3 determines whether or not an abnormal operation is occurring, based on the ranges obtained in advance.

Figure 5:
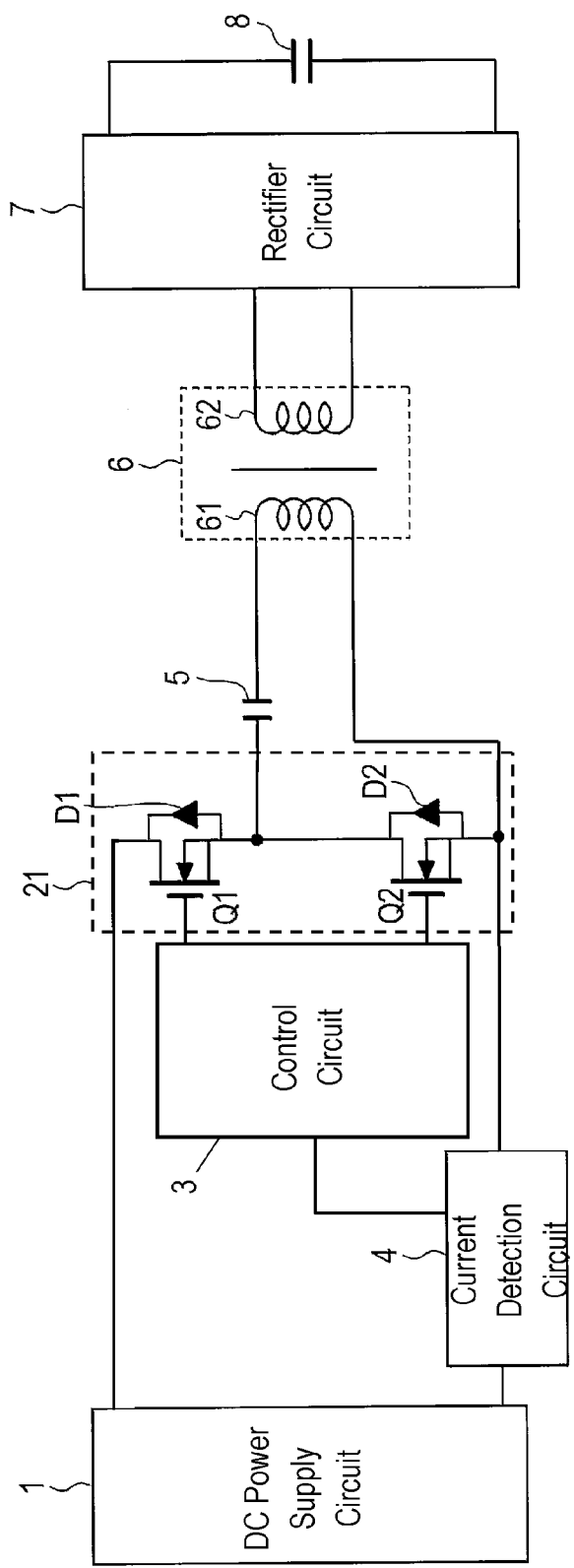
FIG. 5 is a circuit diagram illustrating another example of the configuration of the power conversion device according to the embodiment of the present disclosure.

Moreover, although power conversion device 100 including full-bridge bridge circuit 2 has been described in the above embodiment, the present disclosure is not limited to such an example. For example, as illustrated in FIG. 5, power conversion device 100 may include half-bridge bridge circuit 21.

Moreover, although power conversion device 100 including transformer 6 has been described in the above embodiment, the present disclosure is not limited to such an example. For example, primary winding (power supply coil) and secondary winding (power receiving coil) used for contactless charging may be used as transformer 6.

Moreover, it has been described in the above embodiment that when it is determined that an abnormal operation is occurring, a signal indicating that the abnormal operation is occurring is output to the outside (for example, an upper control circuit). However, the present disclosure is not limited to the example. For example, an operation (power conversion) may be continued while varying the drive frequency so that the drive frequency is greater than the varied resonant frequency by a predetermined amount.

INDUSTRIAL APPLICABILITY

The present disclosure is suitable for a power conversion device which transforms a DC power.

REFERENCE MARKS IN THE DRAWINGS

100 power conversion device
1 DC power supply circuit
2, 21 bridge circuit
Q1, Q2, Q3, Q4 switching element
D1, D2, D3, D4 parasitic diode
C1, C2, C3, C4 output capacitance
3 control circuit
4 current detection circuit
5 resonant capacitor
6 transformer
61 primary winding
62 secondary winding
7 rectifier circuit
8 smoothing capacitor
Le leakage inductance
Lm magnetizing inductance
n1, n2 node

The invention claimed is:

1. A resonance power conversion device comprising:
a bridge circuit which includes a plurality of switching elements, and receives a direct-current (DC) power;
a transformer connected to an output side of the bridge circuit;
a current detection circuit which detects a value of a current flowing through at least one of the plurality of switching elements; and
a control circuit,
wherein the control circuit determines whether or not an abnormality is occurring in the resonance power conversion device, based on the value detected by the current detection circuit at a predetermined time during a switching control, and
wherein the control circuit determines, as the abnormality in the resonance power conversion device, an increase in a resonant frequency from a resonant frequency set at a time of circuit design by at least a predetermined frequency.

2. The resonance power conversion device according to claim 1,
wherein when the control circuit determines that the abnormality is occurring, the control circuit outputs a signal indicating that the abnormality is occurring.

3. The resonance power conversion device according to claim 1,
wherein the predetermined time is a time at which the control circuit outputs a control signal for turning on the at least one of the plurality of switching elements of the bridge circuit, and
the control circuit determines that the abnormality is occurring in the resonance power conversion device, when the value, detected by the current detection circuit at the time at which the control circuit outputs the control signal, is greater than zero.

4. The resonance power conversion device according to claim 1,
wherein the predetermined time is a time at which a predetermined minute time period elapses after the control circuit outputs a control signal for turning off the at least one of the plurality of switching elements of the bridge circuit, and
the control circuit determines whether or not the value, detected by the current detection circuit at the time at which the predetermined minute time period elapses after the control circuit outputs the control signal, is greater than zero, and the control circuit determines that the abnormality is occurring in the resonance power conversion device, when the value, detected by the current detection circuit at the time at which the predetermined minute time period elapses after the control circuit outputs the control signal, is greater than zero.

5. The resonance power conversion device according to claim 1,
wherein the bridge circuit is a full-bridge circuit.

6. The resonance power conversion device according to claim 1,
wherein the bridge circuit is a half-bridge circuit.

7. A method for determining an abnormality in a resonance power conversion device including: a bridge circuit which includes a plurality of switching elements and receives a direct-current (DC) power; a transformer connected to an output side of the bridge circuit; a current detection circuit which detects a value of a current flowing through at least one of the plurality of switching elements; and a control circuit, the method comprising:

detecting, by the current detection circuit, the value of the current flowing through the at least one of the plurality of switching elements, at a predetermined time during a switching control;

determining, by the control circuit, whether or not the abnormality is occurring in the resonance power conversion device based on the detected value of the current; and determining, by the control circuit, an increase in a resonant frequency from a resonant frequency set at a time of circuit design by at least a predetermined frequency, as the abnormality in the resonance power conversion device.

8. A method for determining an abnormality in a resonance power conversion device including: a bridge circuit which includes a plurality of switching elements and receives a direct-current (DC) power; a transformer connected to an output side of the bridge circuit; a current detection circuit which detects a value of a current flowing through at least one of the plurality of switching elements; and a control circuit, the method comprising:

detecting, by the current detection circuit, the value of the current flowing through the at least one of the plurality of switching elements, at a predetermined time during a switching control, wherein the predetermined time is a time at which a predetermined minute time period elapses after the control circuit outputs a control signal for turning off the at least one of the plurality of switching elements of the bridge circuit;

determining, by the control circuit, whether or not the abnormality is occurring in the resonance power conversion device based on the detected value of the current;

determining, by the control circuit, whether or not the value, detected by the current detection circuit at the time at which the predetermined minute time period elapses after the control circuit outputs the control signal, is greater than zero; and determining, by the control circuit, that the abnormality is occurring in the resonance power conversion device, when the value, detected by the current detection circuit at the time at which the predetermined minute time period elapses after the control circuit outputs the control signal, is greater than zero.

9. A resonance power conversion device comprising:

a bridge circuit which includes a plurality of switching elements, and receives a direct-current (DC) power;

a transformer connected to an output side of the bridge circuit;

a current detection circuit which detects a value of a current flowing through at least one of the plurality of switching elements; and a control circuit which determines whether or not an abnormality is occurring in the resonance power conversion device, based on the value detected by the current detection circuit at a predetermined time during a switching control, wherein the predetermined time is a time at which a predetermined minute time period elapses after the control circuit outputs a control signal for turning off the at least one of the plurality of switching elements of the bridge circuit, determines whether or not the value, detected by the current detection circuit at the time at which the predetermined minute time period elapses after the control circuit outputs the control signal, is greater than zero, and determines that the abnormality is occurring in the resonance power conversion device, when the value, detected by the current detection circuit at the time at which the predetermined minute time period elapses after the control circuit outputs the control signal, is greater than zero.

10. The resonance power conversion device according to claim 9, wherein, when the control circuit determines that the abnormality is occurring, the control circuit outputs a signal indicating that the abnormality is occurring.

11. The resonance power conversion device according to claim 9, wherein the bridge circuit is a full-bridge circuit.

12. The resonance power conversion device according to claim 9, wherein the bridge circuit is a half-bridge circuit.

* * * * *